UNITED STATES PATENT OFFICE.

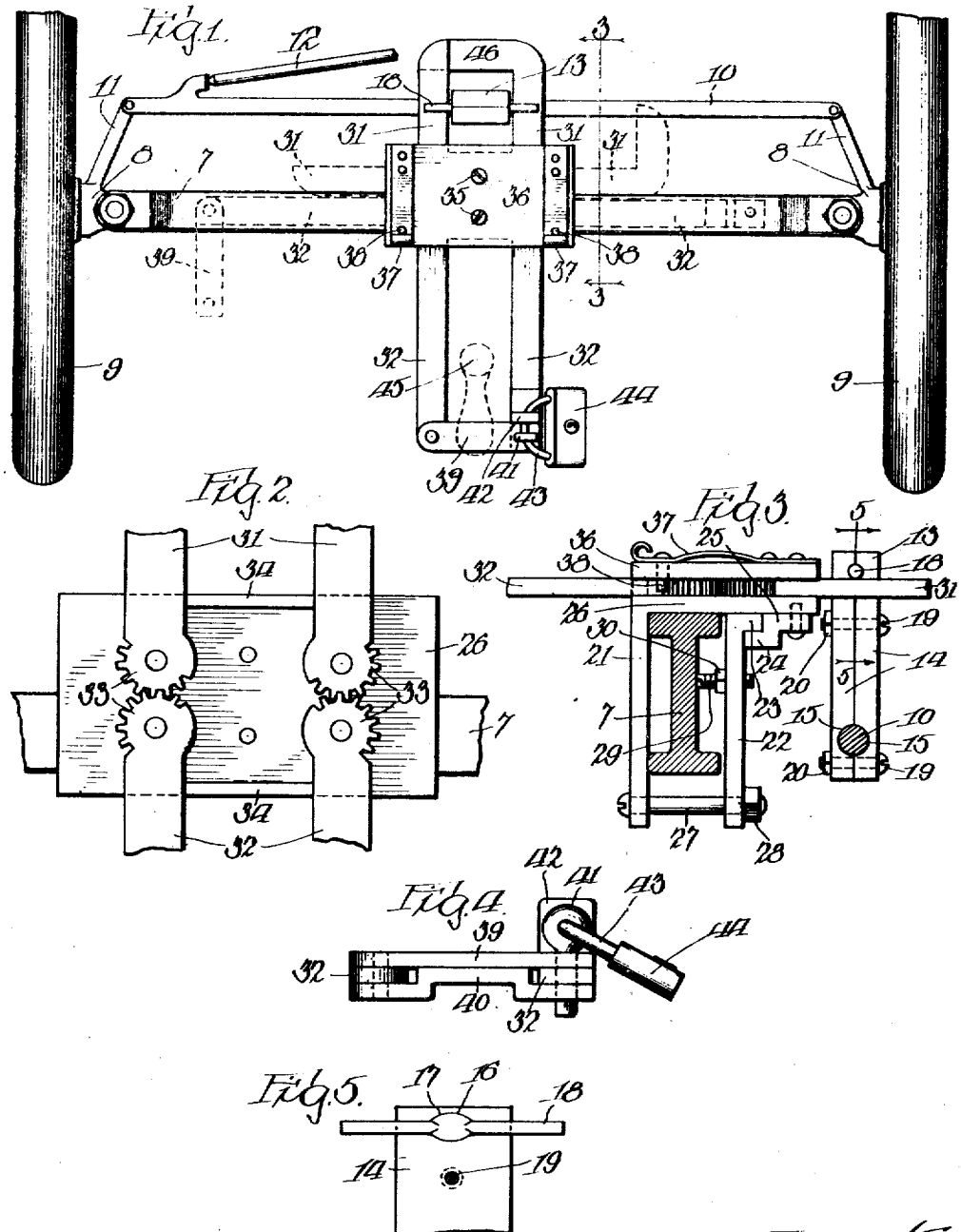

PETER L. HEDBERG, OF CHICAGO, ILLINOIS.

LOCKING AND ANTISTEERING DEVICE FOR AUTOMOBILES.

1,271,573.  Specification of Letters Patent.  Patented July 9, 1918.

Application filed January 18, 1918. Serial No. 212,388.

*To all whom it may concern:*

Be it known that I, PETER L. HEDBERG, a citizen of the United States, residing at Chicago, in the county of Cook and State of Illinois, have invented certain new and useful Improvements in Locking and Antisteering Devices for Automobiles, of which the following is a specification.

This invention relates to an improved attachment or device to be used on automobiles for the purpose of preventing them being stolen or used without authority, and it consists in certain peculiarities of the construction, novel arrangement and operation of the various parts thereof, as will be hereinafter more fully set forth and specifically claimed.

The principal object of the invention is to provide a device of the above mentioned general character, which shall be simple and inexpensive in construction, strong, durable and efficient in operation, with its parts so made and arranged, that it can be readily and permanently attached to the front axle of an automobile, at such a place thereon as to be easily accessible and convenient for locking both the steering mechanism and starting crank against operation, when it is used on an automobile of the type having a starting crank, or for locking the steering mechanism only against operation, when it is used on a machine equipped with a self-starting mechanism. Another object is to so construct the device that it may be adjusted to axles of different sizes and shapes, and can be quickly fixed thereon in a very secure and permanent manner, yet so as to be equally effective in locking the connecting rod, which unites the steering knuckles of the automobile, against operative movement, whether the said rod is located at the rear of the front axle, as is generally the case, or in front of the said axle as in some machines. A further object is to furnish means for safely holding the members of the device in their normal or unlocked positions so as not to accidentally interfere with the movements of any part of the automobile, yet so that they may be instantly turned to their applied or engaging positions. Various other objects and advantages of the invention will be disclosed in the subjoined description and explanation.

In the accompanying drawing which serves to illustrate an embodiment of the invention, Figure 1, is a plan view of the front portion of an automobile, showing by full lines the device mounted on the front axle thereof and its members in the positions they will occupy when locking the steering mechanism and starting crank of the machine, and by dotted lines their normal or non-locking positions.

Fig. 2, is a fragmental plan view of the axle of the automobile showing the device mounted thereon but with the spring carrying cover removed and illustrating portions of the locking arms located in their engaging or locking positions.

Fig. 3, is a view partly in section and partly in elevation taken on line 3—3 of Fig. 1 looking in the direction indicated by the arrows.

Fig. 4 is an end view of the lock engaging end of the device, and

Fig. 5, is a view partly in section and partly in elevation taken on line 5—5 of Fig. 3 looking in the direction indicated by the arrows, showing the manner of securing a stop rod or pin in the standard or upright on the connecting rod of the steering knuckles.

Like numerals of reference refer to corresponding parts throughout the different views of the drawing.

Referring now more particularly to Figs. 1 to 3 inclusive of the drawing, the reference numeral 7 designates the front axle of the automobile, which axle may be of the ordinary or any well known construction, but in the present instance is shown as being of I-beam shape in cross section. This axle is equipped as usual with steering knuckles and wheels 9 of the well known construction. A connecting rod 10 located at the rear of the axle 7 is pivotally connected at its ends to arms 11 extended from the knuckles 8 and said connecting rod is united by means of another rod 12 in a well known way to the steering post, not shown, of the automobile. Mounted on the rod or bar 10 at about its middle is an upright or standard, which is designated as a whole by the numeral 13 and by preference consists of two members 14, see Fig. 3, each of which has in its adjacent surface near its lower end a curved recess 15 to receive the rod 10, and in its adjacent surface near its upper end a recess 16 to receive the flattened or enlarged portion 17 of a stop rod or pin 18 which is transversely located in the upper end of the upright or standard 13 as is clearly shown in Figs. 1, 3 and 5 of the drawing. The members 14 of the standard 13 are clamped together on the rods 15 and 18 by means of bolts 19 extended through suitable openings in said members, and nuts 20 on the ends of said bolts, which ends may be clenched so as to prevent the removal of said nuts.

Mounted on the middle portion of the axle 7 is the holder of the device, which holder consists of an angular member 21 and a vertical plate or member 22 which has on its upper end an outwardly extended flange 23 to engage a flange 24 on the member 25 which is riveted or otherwise secured to the lower surface of the horizontal portion 26 of the member 21 of the holder. The lower portion of the member 21 as well as the lower part of the member 22 is provided with one or more openings for the reception of one or more bolts 27 used for securing said members together and on the axle 7 of the machine. The nuts 28 used on the bolts 27 may be prevented being removed by clenching the ends of said bolts on which the nuts are located. The plate or member 22 is provided at a suitable distance below the flange 23 thereof with one or more screws 29 which will rest at their inner ends against the axle 7 as is clearly shown in Fig. 3 of the drawing. Each of the screws 29 is provided between the plate or member 22 and the axle with a lock nut 30 by turning which it is obvious that the plate 22 can be adjusted toward or from the axle. In assembling the parts of the holder of the device and in applying them to the axle, the horizontal portion 26 of the angular member 21 carrying the member 25 is placed on top of the axle, when by inserting the plate or member 22 into the guide-way formed by the flange 24 on the member 25 and the horizontal portion 26 of the angular member, it is apparent that said plate can be suitably adjusted by means of the screw or screws 29 and nuts thereon. The horizontal portion 26 of the holder forms a table or platform for the locking arms 31 and 32 which are pivotally secured at their inner ends to the upper surface of said table or platform as is clearly shown in Fig. 2 of the drawing, in which view it will be seen that each of the arms 31 and 32 is provided at its inner end with a segmental gear 33 which intermesh with one another in pairs. The part 26 of the holder is provided on its upper surface at its front and rear edges with longitudinally extending ribs 34 used for stopping the inward movement of the locking arms. Located above the arms 31 and 32 at their juncture and secured to the table or platform 26 by means of screws 35, or otherwise is a cover 36 which is employed to protect the gears 33 from dust or dirt. This cover has secured to its upper surface at or near each of its ends a transversely extended spring 37 each of which carries a depending pin 38, which pins are adapted to pass through suitable openings in the cover 36 and engage the arms 32 when the latter are turned to their normal positions as shown by dotted lines in Fig. 1 of the drawing. At its free end one of the arms 32 is provided with a transversely extended bar 39 which is by preference pivotally connected to said arm and has near its free end an opening for the purpose to be presently explained. This bar is preferably reinforced with another bar 40 which lies below the bar 39 and has its ends separated therefrom to receive the arms 32 of the device. The reinforcing bar 40 is provided with an opening to register with the opening in the bar 39 which openings are for the reception of an eye-pin 41 through the eye of which and through an opening in an upward extension 42 the link 43 of a padlock 44 may be extended so as to securely fasten the arms 32 in parallelism with one another.

The operation of the device is simple and as follows: Assuming that the connecting rod 10 is located as shown by continuous lines in Fig. 1 of the drawing, at the rear of the front axle, and that the locking arms 31 and 32 are in the positions indicated by dotted lines in said figure, and that it is desired to lock the steering mechanism against operative movement and the starting crank 45 against operative movement, it is only necessary to place the starting crank 45 in a vertical position and the front wheels 9 in alinement or parallelism with the rear wheels of the automobile. When thus positioned the locking arms 32 can be turned from the dotted line positions shown in Fig. 1 to the continuous line positions of said figure, in which operation it is apparent that by reason of the intermeshing gears 33 on the arms 31 and 32, the arms 31 will be forced into parallelism with one another and in alinement with the arms 32, thus causing the arms 31 to embrace the standard or upright 13 on the connecting rod 10 and the arms 32 to embrace the starting crank 45. The arms 32 can now be locked together by passing the link 43 of a padlock through the opening in the extension 42 and eye of the pin 41. When the parts are thus locked, it is manifest that the starting crank cannot be turned, nor can the steering mechanism be moved laterally to an operative extent, which will prevent the machine being steered if by any possible means it could be started. If the construction of the machine is such as have the connecting bar 10 located in front of the front axle, it is evident that the arms 32 will embrace both the upright 13 on said rod and the starting crank. To more securely brace the arms 31, one of the same has at its free end a lateral extension 46 to under or overlie the free end of the other arm 31 at its rear end. By means of the springs 37 and their pins 38 it is apparent that when the arms 32 are folded to their normal positions as shown by dotted lines in Fig. 1 they will be held in such positions against accidental dislocation, but can be readily released so as to be extended to their locking positions by slightly lifting said springs.

Having thus fully described my invention, what I claim as new and desire to secure by Letters Patent is,

1. In a device of the character described, the combination with the connecting rod of the steering mechanism of an automobile, of an upright standard thereon, a holder operatively mounted on the automobile, locking arms pivotally mounted on the holder and adapted to embrace said standard when they are moved into substantial parallelism with one another, means for engaging the pivoted ends of said arms to move them into and out of applied positions, and means to lock said moving means when said arms are in their applied positions.

2. In a device of the character described, the combination with the starting crank and connecting rod of the steering mechanism of an automobile, of an upright standard on said rod, a holder operatively mounted upon the automobile, locking arms pivotally mounted on the holder and adapted to embrace said crank and standard when they are moved into substantial parallelism with one another, and means to lock said arms in their applied positions.

3. In a device of the character described, the combination with the front axle and the connecting rod of the steering mechanism of an automobile, of an upright standard on said rod, a holder operatively mounted on the axle, locking arms pivotally mounted on the holder and adapted to embrace said standard when moved into substantial parallelism with one another, means engaging the pivoted ends of said arms to move them into and out of applied positions, and means to lock said moving means when said arms are in their applied positions.

4. In a device of the character described, the combination with the front axle and the starting crank of an automobile, of a holder operatively mounted on the axle, locking arms pivotally mounted on the holder for lateral movement and adapted to embrace said crank when they are moved into substantial parallelism with one another, and means to lock said arms in their applied positions.

5. In a device of the character described, the combination with the front axle, the starting crank and connecting rod of the steering mechanism of an automobile, of an upright standard on said rod, a holder operatively mounted on the axle, locking arms pivotally mounted on the holder and adapted to embrace said standard when they are moved into substantial parallelism with one another, and means to lock said arms in their applied positions.

6. In a device of the character described, the combination with the front axle and the connecting rod of the steering mechanism of an automobile, of an upright standard on said rod, a holder consisting of an angular member and an adjustable plate mounted on the axle, said angular member having a horizontally disposed platform provided on its upper surface with stopping ribs for the locking arms and on its lower surface with a flanged member located longitudinally with respect to the axle, and said plate having at its upper portion a flange to engage the first named flange, means to secure the angular member and plate together, locking arms pivotally mounted on the said platform and adapted to embrace said standard when moved into substantial parallelism with one another, and means to lock said arms in their applied positions.

7. In a device of the character described, the combination with the connecting rod of the steering mechanism of an automobile, of an upright standard thereon, a holder operatively mounted upon the automobile, locking arms pivotally mounted on the holder and adapted to embrace said standard when moved into substantial parallelism with one another, means engaging the pivoted ends of said arms to move them into and out of applied positions, means to lock said moving means when said arms are in their applied positions, and means to hold said arms in their normal positions.

PETER L. HEDBERG.

Witnesses:
 CHAS. C. TILLMAN,
 LILLIE C. BERG.